United States Patent
Tan et al.

(10) Patent No.: US 8,948,007 B2
(45) Date of Patent: Feb. 3, 2015

(54) INTEROPERABLE QUALITY OF SERVICE PRE-NEGOTIATION

(75) Inventors: Thomas H. Tan, San Jose, CA (US);
Lalit R. Kotecha, San Ramon, CA (US);
Jay J. Lee, San Ramon, CA (US);
Steven R. Rados, Danville, CA (US);
Arda Aksu, Martinez, CA (US);
Priscilla Lau, Fremont, CA (US);
Patricia Ruey-Jane Chang, San Ramon, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 882 days.

(21) Appl. No.: 13/158,716

(22) Filed: Jun. 13, 2011

(65) Prior Publication Data
US 2012/0314568 A1  Dec. 13, 2012

(51) Int. Cl.
*H04L 12/28* (2006.01)
*H04W 72/08* (2009.01)
*H04L 12/857* (2013.01)
*H04W 28/24* (2009.01)
*H04W 12/08* (2009.01)
*H04L 12/24* (2006.01)

(52) U.S. Cl.
CPC ........... *H04L 47/2491* (2013.01); *H04W 12/08* (2013.01); *H04L 41/0896* (2013.01); *H04W 28/24* (2013.01); *H04L 41/0893* (2013.01)
USPC ........... 370/230; 370/235; 370/252; 370/328; 370/331; 370/338; 455/422.1; 455/512; 455/67.13; 455/11.1

(58) Field of Classification Search
CPC ..... H04W 76/022; H04W 4/24; H04W 28/18; H04L 41/5022; H04L 12/1407; H04L 12/14; H04L 41/0896; H04L 47/805; H04L 47/824; H04M 15/66; H04M 15/00; H04M 15/64; H04M 15/80; H04M 15/8016
USPC .................................................. 370/208–356
See application file for complete search history.

(56) References Cited

U.S. PATENT DOCUMENTS

| | | | |
|---|---|---|---|
| 7,209,458 B2* | 4/2007 | Ahvonen et al. | 370/328 |
| 7,826,353 B2* | 11/2010 | Honkasalo et al. | 370/230 |
| 8,400,916 B2* | 3/2013 | Cutler et al. | 370/230 |
| 8,498,208 B2* | 7/2013 | Wang et al. | 370/235 |
| 8,542,584 B2* | 9/2013 | Ludwig et al. | 370/230 |
| 8,605,583 B2* | 12/2013 | Cutler et al. | 370/230 |
| 8,644,337 B2* | 2/2014 | Siddam et al. | 370/468 |
| 8,645,510 B2* | 2/2014 | Siddam | 709/221 |
| 8,660,026 B2* | 2/2014 | Yang et al. | 370/252 |
| 8,661,145 B2* | 2/2014 | Zhou et al. | 709/228 |
| 8,675,663 B2* | 3/2014 | Siddam et al. | 370/395.21 |
| 8,682,243 B2* | 3/2014 | Bienas et al. | 455/11.1 |
| 8,705,503 B2* | 4/2014 | Yang et al. | 370/338 |
| 2004/0223602 A1* | 11/2004 | Honkasalo et al. | 379/243 |
| 2007/0160015 A1* | 7/2007 | Andriantsiferana | 370/338 |
| 2008/0299911 A1* | 12/2008 | Chen et al. | 455/67.13 |

(Continued)

*Primary Examiner* — Venkatesh Haliyur

(57) ABSTRACT

A system configured to receive a request to identify a quality of service (QoS) policy to be used to process traffic that is received from a user device associated with another network; obtain an interoperable QoS policy, where the interoperable QoS policy identifies a first QoS level, associated with the other network, that corresponds to a type of traffic received from the user device; obtain, from the interoperable QoS policy, a second QoS level that corresponds to the first QoS level; and send, to a device, an instruction to process the traffic based on the second QoS level.

20 Claims, 6 Drawing Sheets

(56) References Cited

U.S. PATENT DOCUMENTS

| | | | |
|---|---|---|---|
| 2008/0310303 A1* | 12/2008 | Wang et al. | 370/230.1 |
| 2010/0099405 A1* | 4/2010 | Brisebois et al. | 455/434 |
| 2010/0128722 A1* | 5/2010 | Madour et al. | 370/352 |
| 2011/0075675 A1* | 3/2011 | Koodli et al. | 370/401 |
| 2011/0141890 A1* | 6/2011 | Giaretta et al. | 370/232 |
| 2011/0170411 A1* | 7/2011 | Wang et al. | 370/235 |
| 2011/0202485 A1* | 8/2011 | Cutler et al. | 706/12 |
| 2011/0289196 A1* | 11/2011 | Siddam | 709/220 |
| 2011/0317718 A1* | 12/2011 | Siddam et al. | 370/468 |
| 2012/0002540 A1* | 1/2012 | Siddam et al. | 370/230 |
| 2012/0026947 A1* | 2/2012 | Miller et al. | 370/329 |
| 2012/0028626 A1* | 2/2012 | Marocchi et al. | 455/422.1 |
| 2012/0108343 A1* | 5/2012 | Marsico | 463/42 |
| 2012/0127975 A1* | 5/2012 | Yang et al. | 370/338 |
| 2012/0155298 A1* | 6/2012 | Yang et al. | 370/252 |
| 2012/0158977 A1* | 6/2012 | Zhou et al. | 709/228 |
| 2012/0163204 A1* | 6/2012 | Oprescu-Surcobe et al. | 370/252 |
| 2012/0202491 A1* | 8/2012 | Fox et al. | 455/435.1 |
| 2012/0218888 A1* | 8/2012 | Cutler et al. | 370/230 |
| 2012/0221955 A1* | 8/2012 | Raleigh et al. | 715/736 |
| 2012/0250509 A1* | 10/2012 | Leung et al. | 370/235 |
| 2012/0264443 A1* | 10/2012 | Ng et al. | 455/450 |
| 2012/0269167 A1* | 10/2012 | Velev et al. | 370/331 |
| 2012/0287784 A1* | 11/2012 | Shatzkamer et al. | 370/230.1 |
| 2012/0303835 A1* | 11/2012 | Kempf et al. | 709/235 |
| 2013/0016696 A1* | 1/2013 | Adjakple et al. | 370/331 |
| 2013/0028127 A1* | 1/2013 | Zheng et al. | 370/252 |
| 2013/0067082 A1* | 3/2013 | Khan | 709/225 |
| 2013/0121206 A1* | 5/2013 | Turanyi et al. | 370/254 |
| 2013/0176975 A1* | 7/2013 | Turanyi et al. | 370/329 |
| 2013/0182555 A1* | 7/2013 | Raaf et al. | 370/216 |
| 2013/0272251 A1* | 10/2013 | Schmidt et al. | 370/329 |
| 2014/0050095 A1* | 2/2014 | Szilagyi et al. | 370/236 |
| 2014/0086177 A1* | 3/2014 | Adjakple et al. | 370/329 |

* cited by examiner

| QCI VALUE 410 | TRAFFIC TYPE 420 | FORWARDING CLASSIFICATION 430 |
|---|---|---|
| QCI 1 | TYPE 1 | FC 1 |
| QCI 2 | TYPE 2 | FC 2 |
| QCI 3 | TYPE 3 | FC 3 |
| QCI N | TYPE N | FC N |
| ... | ... | ... |

| TRAFFIC TYPE 510 | NETWORK INFORMATION 505-1 | NETWORK INFORMATION 505-2 | ... | NETWORK INFORMATION 505-P |
|---|---|---|---|---|
| | QCI VALUE 515-1 | QCI VALUE 515-2 | ... | QCI VALUE 515-P |
| TYPE 1 | QCI 1 | QCI 1 | ... | QCI 2 |
| TYPE 2 | QCI 2 | QCI 3 | ... | QCI 1 |
| TYPE 3 | QCI 3 | QCI 2 | ... | QCI 3 |
| TYPE 4 | QCI 4 | QCI 4 | ... | QCI 5 |
| ... | | | | |

INTEROPERABLE QUALITY OF SERVICE PRE-NEGOTIATION

BACKGROUND

Evolved Packet System (EPS) is a core network architecture associated with the third generation partnership project (3GPP) wireless communication standard. The EPS includes an evolved packet core (EPC) through which traffic, associated with a communication session with a user device, is transported to and/or received from a network (e.g., the Internet, a packet data network, etc.). The EPS also includes a long term evolution (LTE) network, which is a radio access network (RAN) via which the user device communicates with the EPC during the communication session. The EPS may communicate with an Internet protocol (IP) multimedia subsystem (IMS) core. The IMS core may manage authentication, session initiation, network policies, etc. associated with the communication session.

The IMS core (e.g., using a policy and charging resource function (PCRF)) may establish a first quality of service (QoS) policy that governs the manner in which traffic, associated with a user device, is processed by the EPS. A second QoS policy may be used by a different network when processing traffic associated with another user device. Unfortunately, the first QoS policy, associated with the IMS core may be different than the second QoS policy associated with the other network. The difference between the first and second QoS policies may cause traffic, associated with a communication session between the user device and the other user device, to be processed in a manner that does not conform to the first QoS policy.

BRIEF DESCRIPTION OF THE DRAWINGS

FIG. 4 is a diagram of an example quality of service (QoS) data structure according to an implementation described herein;

FIG. 5 is a diagram of an example interoperable QoS policy data structure according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods, described herein, may enable a network to process traffic, received from a user device associated with a remote network, in a manner that conforms to a remote QoS policy associated with the remote network. The systems and/or methods may enable a PRCF server, associated with the network, to obtain information associated with an interoperable QoS policy that includes information associated with one or more QoS policies that are used by the network, the remote network, and/or another network.

A QoS policy may include one or more forwarding classifications that correspond to one or more types of traffic and/or services (e.g., streaming video, streaming audio, Internet traffic, gaming, data, etc.) being transported via a network. Each type of traffic and/or service may be associated with a respective QoS classification identifier (QCI) value (e.g., 1, 2, 3, etc.) that corresponds to a respective forwarding priority, data rate, bandwidth, probability of packet loss, etc. for each type of traffic and/or service.

The systems and/or methods may enable the PRCF server to use the interoperable QoS policy to obtain a QCI value, associated with the remote network, which corresponds to a type of traffic being received from the user device. The QCI value may correspond to the remote QoS policy that identifies a forwarding priority, a bandwidth, a data rate, a probability of packet loss, etc. by which the remote network would process the type of traffic.

The systems and/or methods may enable the PRCF server to obtain, from the interoperable QoS policy, another QCI value that corresponds to the type of traffic. The other QCI value may be associated with a QoS policy that corresponds to the network. The PRCF server may use the other QCI value to obtain, from the QoS policy, another forwarding priority, bandwidth, data rate, probability of packet loss, etc. that conforms to the remote QoS policy.

The systems and/or methods may enable the PRCF server to cause the network to process the traffic, based on the other forwarding priority, bandwidth, data rate, probability of packet loss, etc., in a manner that conforms to the remote QoS policy. Processing the traffic, in the manner that conforms to the remote QoS policy, may enable the traffic and/or the services (e.g., that would have been provided by the remote network) to be provided to the user device without degrading performance and/or a user experience for the user of the user device.

Figure 1:
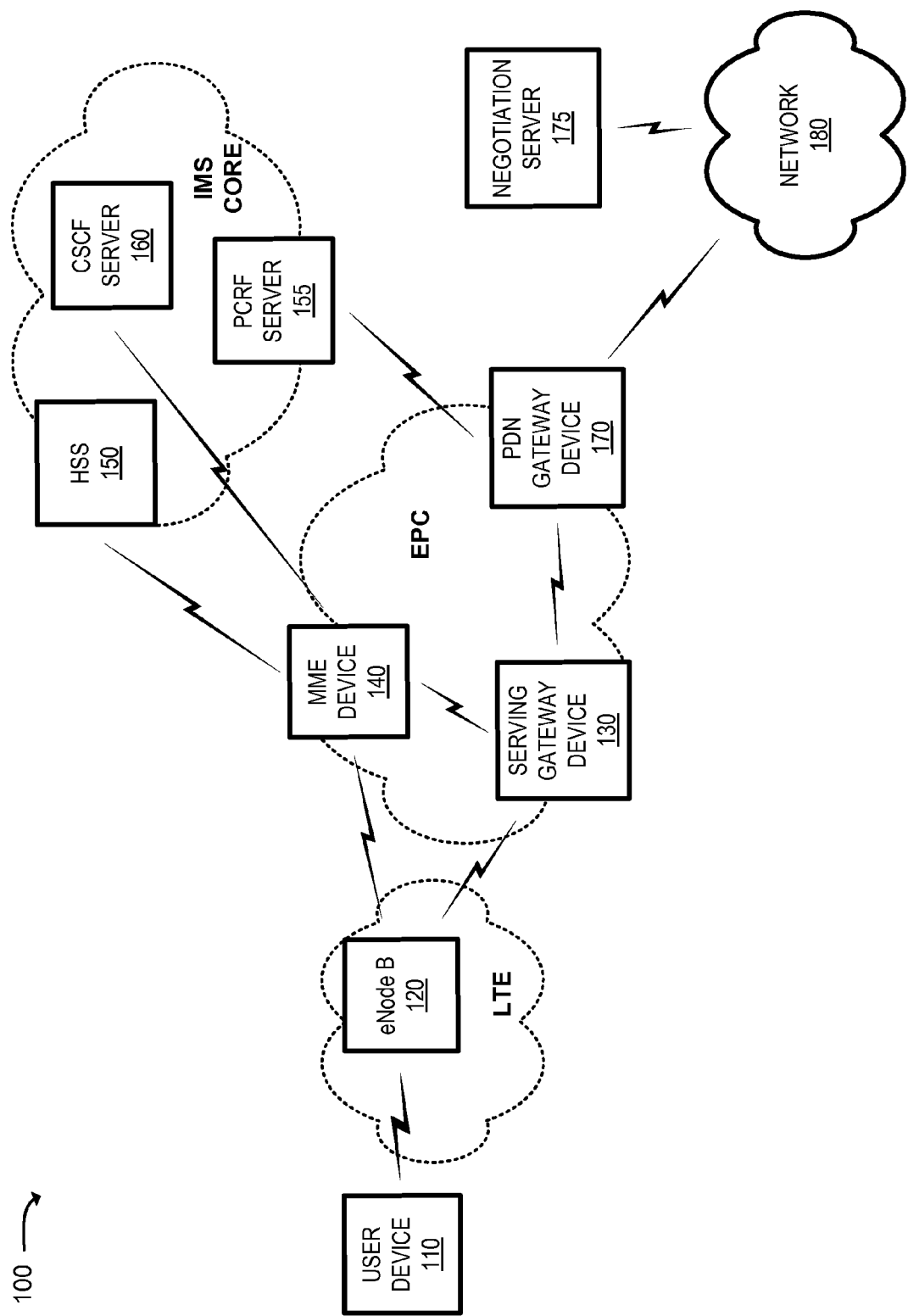
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a user device 110, an e-Node B 120 (hereinafter referred to as an "eNB 120"), a serving gateway device 130 (hereinafter referred to as a "SGW 130"), a mobility management entity device 140 (hereinafter referred to as "MME 140"), a home subscriber server 150 (hereinafter referred to as a "HSS 150"), a policy and charging resource function (PCRF) server 155, a call session control function (CSCF) server 160 (hereinafter referred to as a "CSCF server 160"), a packet data network (PDN) gateway device 170 (hereinafter referred to as a "PGW 170"), a negotiation server 175, and a network 180. The number of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1.

Also, in some implementations, one or more of the devices of environment 100 may perform one or more functions described as being performed by another one or more of the devices of environment 100. Further, PCRF server 155, CSCF server 160, and/or negotiation server 175 may be integrated into a single device. Devices of environment 100 may interconnect via wired connections, wireless connections, or a combination of wired and wireless connections.

Environment 100 may correspond to an Internet Protocol (IP) multimedia subsystem (IMS) core and/or an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more eNBs 120 via which user device 110 communicates with the EPC and/or other user devices 110. The EPC may include SGW 130, MME 140, and/or PGW 170 that enables user device 110 to communicate with network 180, other user devices 110, and/or the IMS core. The IMS core may include HSS 150, PCRF server 155, and/or CSCF server 160, and may manage authentication, security and/or protection protocols, session initiation protocols, account information, network policy enforcement, profile information, etc. associated with user device 110.

User device 110 may include any computation or communication device, such as a wireless mobile communication device that is capable of communicating with eNB 120 and/or a network (e.g., network 180). For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of mobile computation or communication device. In one example, user device 110 may send traffic to and/or receive traffic from the EPS. In another example, user device 110 may place calls to other user devices 110 and/or receive calls from other user devices 110 via the EPS. In yet another example, user device 110 may be a remote user device 110, associated with a remote network (e.g., network 180 and/or some other network), that communicates via eNB 120 (e.g., by roaming) when remote user device 110 enters and/or powers up within a cell associated with eNB 120.

eNB 120 may include one or more devices that receive, process, and/or transmit traffic, such as voice, video, text, and/or other data, destined for and/or received from user device 110. One or more eNBs 120 may be associated with the LTE network that receives traffic from and/or sends traffic to network 180 and/or the IMS core via the EPC. eNB 120 may send traffic to and/or receive traffic from user device 110 via an air interface (via an LTE-Uu interface). eNB 120 may enforce uplink and/or downlink policies (e.g., via rate policing)

eNB 120 may receive a notification from PCRF server 155 that identifies a policy (e.g., a forwarding priority, a data rate, a bandwidth, etc.) to be enforced with respect to traffic that is transmitted to and/or from user device 110. eNB 120 may receive the notification and may process the traffic based on the policy.

SGW 130 may include one or more devices, or other types of computation or communication devices, that gather, process, search, store, and/or provide information in a manner described herein. SGW 130 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 130 may, for example, aggregate traffic received from one or more eNBs 120 and may send the aggregated traffic to network 180 (e.g., via PGW 170) and/or other devices associated with the IMS core and/or the EPC. SGW 130 may also receive traffic from the other network devices and/or may send the received traffic to user device 110 via eNB 120. For example, SGW 130 may receive an instruction (e.g., as a result of a registration operation, handoff operation, and/or some other operation) from MME 140 to establish a connection (e.g., a tunnel) that permits user device 110 to communicate with other user devices 110 and/or network devices associated with the LTE, the EPC, the IMS core, and/or network 180.

SGW 130 may receive a notification from PCRF server 155 that identifies a policy (e.g., a forwarding priority, a data rate, a bandwidth, etc.) to be enforced with respect to traffic that is being transmitted via the EPC. SGW 130 may receive the notification and may process the traffic based on the policy.

MME 140 may include one or more devices, or other types of computation or communication devices, that gather, process, search, store, and/or provide information in a manner described herein. For example, MME 140 may perform operations associated with a handoff to and/or from the EPS. MME 140 may perform operations to register user device 110 with the EPS, to handoff user device 110 from the EPS to another network, to handoff a user device 110 from the other network to the EPS, and/or to perform other operations. MME 140 may perform policing operations on traffic destined for and/or received from user device 110.

HSS 150 may include one or more server devices, or other types of computation or communication devices, that gather, process, search, store, and/or provide information in a manner described herein. For example, HSS 150 may manage, update, and/or store, in a memory associated with HSS 150, service profile information associated with user device 110. The service profile information may include information associated with services to which user device 110 has subscribed (e.g., call forwarding, call waiting, etc.); access point names (APNs) that are permitted for and/or accessible by user device 110; information associated with a user of user device 110 (e.g., a username, a password, a personal identification number (PIN), etc.); rate information; minutes allowed; and/or other information. Additionally, or alternatively, HSS 150 may include a device that performs authentication, authorization, and/or accounting (AAA) operations associated with a call session with user device 110. HSS 150 may receive, from MME device 140, an indication that user device 110 is attempting to establish a call session with the EPC and may identify via which CSCF server 160 the session is to be initiated.

HSS 150 may communicate with negotiation server 175 to obtain information (e.g., a network address, etc.) regarding another HSS 150 associated with another network (e.g., a remote network). HSS 150 may communicate with the remote HSS 150 to obtain service profile information corresponding to user device 110 (e.g., a remote user device 110) that is associated with the remote network. HSS 150 may use the service profile information to identify which services, APNs, etc. to allow the remote user device 110 to access while communicating via environment 100. HSS 150 may also communicate with the remote HSS 150 to authenticate the remote user device 110.

PCRF server 155 may include one or more server devices, or other types of computation or communication devices, that gather, process, search, store, and/or provide information in a manner described herein. In one example implementation, PCRF server 155 may perform operations to establish and/or identify policies associated with a communication session and/or a call associated with user device 110. For example, PCRF server 155 may dynamically establish and/or identify real-time forwarding priorities, bandwidth allocations, data rates, and/or controls (e.g., associated with a particular APN) associated with particular types of traffic, applications, network accesses, and/or services provided to user device 110 during a communication and/or call session. In another example, PCRF server 155 may dynamically establish and/or identify a real-time signal flow policy to adapt to changing conditions within the network and/or to manage traffic flow during the communication and/or call session. PCRF server 155 may provide a quality of service (QoS) policy associated with the call session. PCRF server 155 may send information associated with the policies to signal bearer devices associated with the call and/or communication session (e.g., eNB 120, SGW 130, PGW 170, etc.).

PCRF server 155 may receive a notification from CSCF server 160 that indicates that user device 110 is a remote user device 110 that is associated with a remote network (e.g., network 180 and/or some other network). The notification may include information associated with the traffic received from user device 110, such as, for example, information associated with a type of traffic and/or service (e.g., voice over Internet protocol (VoIP), streaming video, IMS signaling, messaging, gaming, etc.), a network address (e.g., a source address, a destination address, etc.), information associated with a remote network (e.g., such as a gateway identifier, domain information, etc.), information associated with user device 110 (e.g., a mobile directory number (MDN), a media access control (MAC) address, etc.), etc.

PCRF server 155 may communicate with negotiation server 175 to obtain information associated with an interoperable QoS policy. PCRF server 155 may obtain, from the information associated with the interoperable QoS policy, information associated with a remote QoS policy that is associated with a remote network with which user device 110 is associated. PCRF server 155 may obtain, from the information associated with remote QoS policy a QCI value (e.g., 1, 2, 3, etc.) that corresponds to a type of traffic and/or service being received from and/or sent to the remote user device 110.

PCRF server 155 may obtain another QCI value, from the information associated with the interoperable QoS policy, which corresponds to the QCI value. The other QCI value may be associated with environment 100 (e.g., a local network) and may be used to identify a local QoS policy to be used to process the traffic. PCRF server 155 may use the other QCI value to identify a forwarding priority, bandwidth, data rate, etc. to be used to process the traffic. PCRF server 155 may send an instruction, to one or more signal bearers via which the traffic is being processed (e.g., eNB 120, SGW 130, PGW 170, etc.), indicating that the traffic is to be processed based on the forwarding priority, bandwidth and/or data rate, associated with the other QCI value.

PCRF server 155 may transmit information, associated with the local QoS policy, to negotiation server 175 to update and/or establish the information associated with the interoperable QoS policy.

CSCF server 160 may include one or more server devices, or other types of computation or communication devices, that gather, process, search, store, and/or provide information in a manner described herein. In one example implementation, CSCF server 160 may execute a session initiation protocol (SIP) associated with establishing a call session with user device 110. In an example implementation, CSCF server 160 may be a serving-CSCF server. CSCF server 160 may communicate via network 180 and may process and/or route traffic to and/or from user device 110. CSCF server 160 may, for example, route traffic received from user device 110 (e.g., via eNB 120) and may route the traffic to a destination device and/or perform operations associated with monitoring minutes and/or billing information associated with the traffic.

CSCF server 160 may receive a query from SGW 130 to identify via which eNB 120 and/or other SGW 130 a call is to be routed to a destination user device 110. CSCF server 160 may use information associated with the destination user device 110 on which to base the determination (e.g., from a look up table) via which eNB 120 and/or other SGW 130 the traffic is to be routed. Based on the determination, CSCF server 160 may send information, associated with the identified eNB 120 and/or the other SGW 130, to SGW 130.

CSCF server 160 may receive a request (e.g., SIP request) from user device 110 to place a call and/or initiate a communication session. CSCF server 160 may communicate with HSS 150 to determine whether user device 110 is a local user device 110 (e.g., associated with environment 100) or a remote user device 110 (e.g., associated with a remote network, such as network 180 and/or some other network). CSCF server 160 may send an instruction to PCRF server 155 to identify a local QoS policy, which conforms to a remote QoS policy, with which to process the traffic received from and/or sent to remote user device 110.

PGW 170 may include one or more devices, or other types of computation or communication devices, that gather, process, search, store, and/or provide information in a manner similar to that described herein. PGW 170 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 170 may include a device that aggregates traffic received from one or more SGWs 130 and may send the aggregated traffic to network 180 and/or the IMS core (e.g., PCRF server 155, CSCF server 160, etc.). In another example implementation, PGW 170 may receive traffic from network 180 and may send the traffic to user device 110 via SGW 130 and/or eNB 120. PGW 170 may perform policing operations on traffic destined for the EPS.

PGW 170 may receive an instruction, from PCRF server 155, to enforce a QoS policy when processing the traffic received from and/or sent to user device 110. PGW 170, may, in response to the instruction, enforce the QoS policy based on a forwarding priority, a data rate, a bandwidth, etc. identified by the QoS policy.

Negotiation server 175 may include one or more server devices, or other types of computation or communication devices, that gather, process, search, store, and/or provide information in a manner described herein. In one example implementation, negotiation server 175 may perform an operation to identify an interoperable QoS policy that governs traffic being transported between networks (e.g., a local network, a remote network, etc.). Negotiation server 175, may, for example, receive information associated with a respective QoS policy from each of one or more networks. The information associated with the respective QoS policy may include a one or more QCI values (e.g., 1, 2, 3, etc.) that corresponds to different types of traffic and/or services being transported via each network.

Negotiation server 175 may generate the interoperable QoS policy based on the information, associated with the respective QoS policy, received from each of the networks. For example, the interoperable QoS policy may identify a QCI value (e.g., 1) for streaming video being transported, via a remote network, based on a QoS policy associated with the remote network (e.g., a remote QoS policy). The QCI value may indicate that the streaming video is to be processed, by the remote network, based on a forwarding priority, data rate, bandwidth, etc. The interoperable QoS policy may indicate that the QCI value, for the remote network, corresponds to another QCI value (e.g., 2) for streaming video being transported via a local network (e.g., environment 100). The other QCI value may indicate that the streaming video is to be processed, by the local network, based on another forwarding priority, data rate, bandwidth, etc. that conforms to the remote QoS policy.

Negotiation server 175 may respond to a request, from PCRF server 155, for a QCI value. The request for the QCI value may be as a result of a request, from user device 110 associated with the remote network (e.g., network 180 and/or some other network), to PCRF server 155 to establish a communication and/or call session. The request may identify a type of traffic and/or service being sent to and/or received from user device 110. The request may also include information associated with the remote network with which user device 110 is associated. Negotiation server 175 may, in response to the request, use the interoperable QoS policy to identify a QCI value, associated with the remote network, based on the type of traffic. Negotiation server 175 may use the QCI value to obtain, from the interoperable QoS policy, another QCI value, associated with environment 100, that corresponds to the QCI value for the type of traffic and/or service. Negotiation server 175 may transmit, to PCRF server 155, the other QCI value. The other QCI value may permit PCRF server 155 to identify a local QoS policy (e.g., a forwarding priority, a data rate, a bandwidth, etc.) with which to process the traffic that conforms to the remote QoS policy associated with the remote network.

Negotiation server 175 may also store, within the interoperable QoS policy, information (e.g., network addresses, device identifiers, etc.) associated with one or more HSSs 150 for one or more networks. The information associated with HSSs 150 may enable HSS 150, associated with environment 100, to communicate with a remote HSS 150 associated with the remote network (e.g., to authenticate user device 110, to obtain service profile information, etc.).

Network 180 may include one or more wired and/or wireless networks. For example, network 180 may include a cellular network, a public land mobile network (PLMN), a second generation (2G) network, a third generation (3G) network, a fourth generation (4G) network, a fifth generation (5G) network, and/or another network. Additionally, or alternatively, network 180 may include a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. Network 180 may transport traffic to and/or from the EPS (e.g., via PGW 170) and/or another network.

Figure 2:
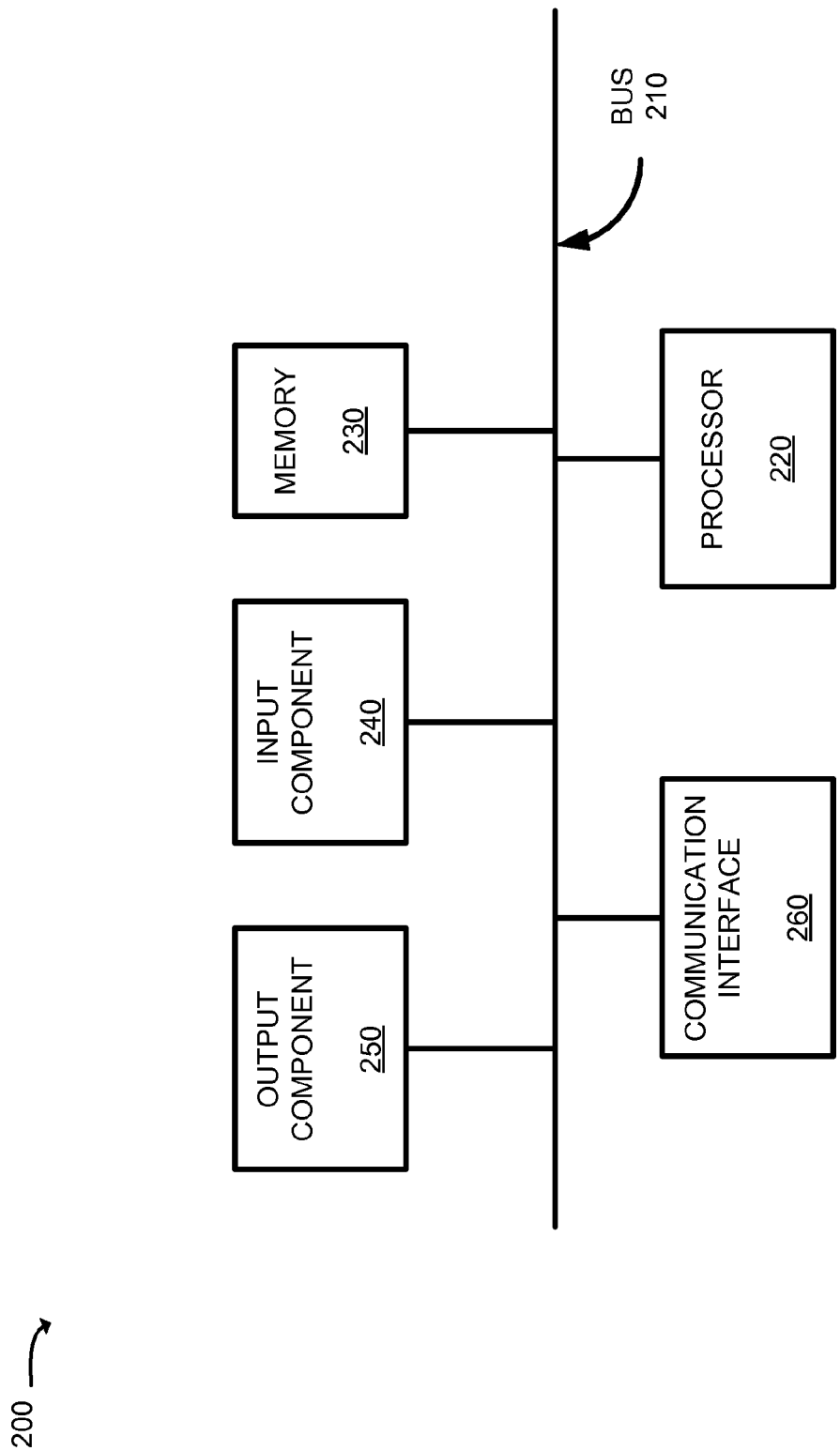
FIG. 2 is a diagram of example components of one or more devices of FIG. 1.

FIG. 2 is a diagram of example components of a device 200. Device 200 may correspond to user device 110, MME 140, HSS 150, PCRF server 155, CSCF server 160, and/or negotiation server 175. Alternatively, or additionally, each of user device 110, MME 140, HSS 150, PCRF server 155, CSCF server 160, and/or negotiation server 175 may include one or more devices 200.

Device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as network 180. In one alternative implementation, communication interface 260 may be a logical component that includes input and output ports, input and output systems, and/or other input and output components that facilitate the transmission of data to other devices.

As described herein, device 200 may perform certain operations described herein. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
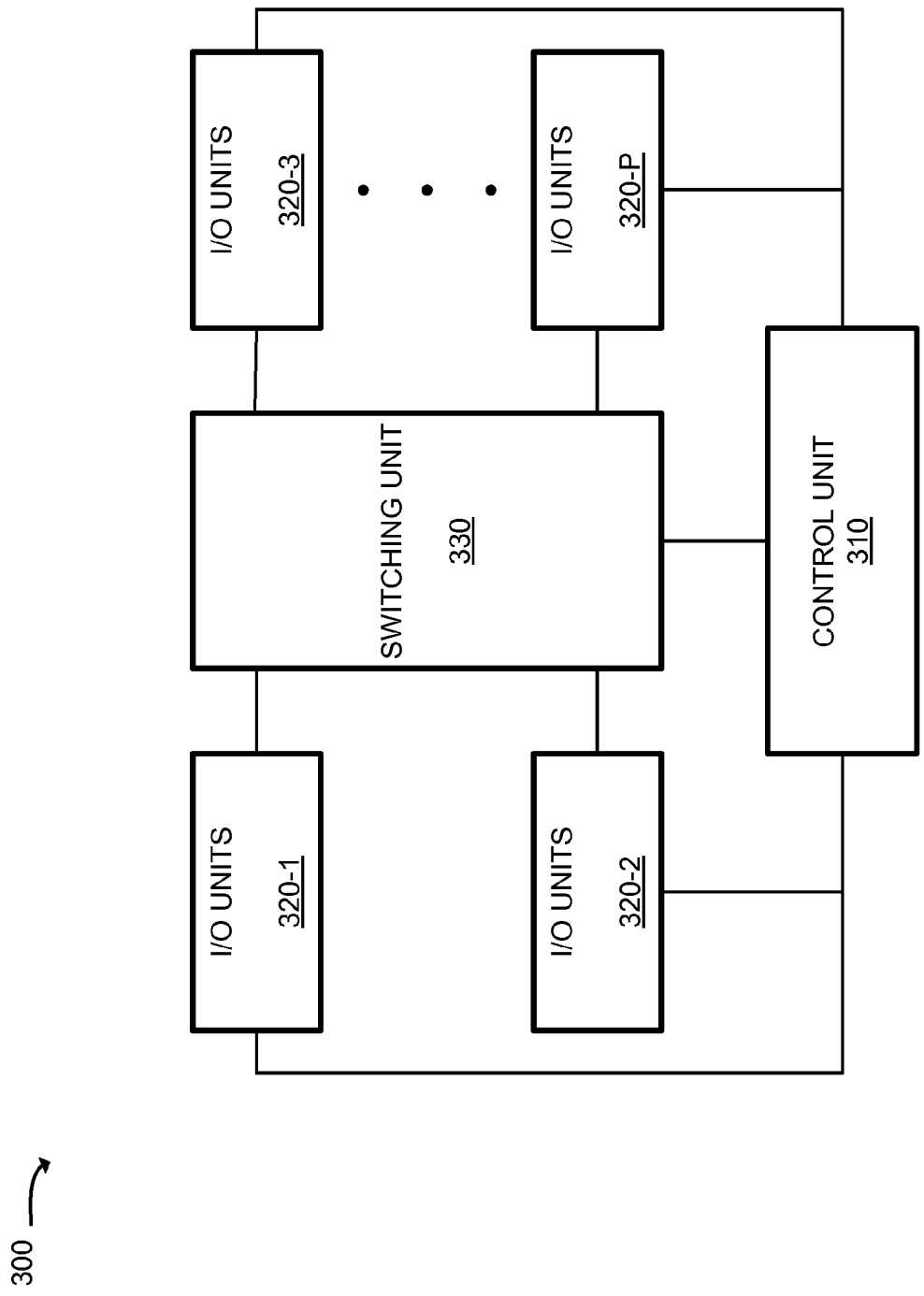
FIG. 3 is a diagram of example components of one or more devices of FIG. 1.

FIG. 3 is a diagram of example components of device 300 that may correspond to one or more of eNB 120, SGW 130, and/or PGW 170. Alternatively, or additionally, eNB 120, SGW 130, and/or PGW 170 may include one or more devices 300. Although, FIG. 3 illustrates example components of device 300, in other implementations, device 300 may include additional components, fewer components, different components, or differently arranged components than those illustrated in FIG. 3 and described herein. Additionally, or alternatively, one or more operations described as being performed by a particular component of device 300 may be performed by one or more other components, in addition to or instead of the particular component of device 300.

Device 300 may receive network traffic, as one or more packet stream(s), from physical links, may process the packet stream(s) to determine destination information, and may transmit the packet stream(s) out on links in accordance with the destination information. Device 300 may include a control unit 310, a set of input/output (I/O) units 320-1, . . . , 320-P (where P≥1) (hereinafter referred to collectively as "I/O units 320" and individually as "I/O unit 320"), and a switching unit 330.

Control unit 310 may include a processor, a microprocessor, or some form of hardware logic (e.g., an application specific integrated circuit (ASIC) or a field programmable gate array (FPGA)). In one example implementation, control unit 310 may include an Ethernet controller and/or another controller device. Control unit 310 may perform high level management functions for device 300. For example, control unit 310 may maintain the connectivity and manage information/data necessary for transferring packets by device 300. Control unit 310 may create routing tables based on network topology information, create forwarding tables based on the routing tables, and communicate the forwarding tables to I/O units 320. I/O units 320 may use the forwarding tables to perform route lookup for incoming packets and perform the forwarding functions for device 300. Control unit 310 may also perform other general control and monitoring functions for device 300.

I/O unit 320 may include a component or collection of components to receive incoming packets, to process incoming and/or outgoing packets, and/or to transmit outgoing packets. For example, I/O unit 320 may include I/O ports, a packet forwarding component (PFC), an Ethernet interface and/or another type of interface, a central processing unit (CPU), and/or a memory device. I/O unit 320 may include a collection of ports that receive or transmit packets via physical links. I/O unit 320 may also include packet processing component(s), switch interface component(s), Internet processor component(s), memory device(s), etc.

Each of I/O units 320 may be connected to control unit 310 and switching unit 330. I/O units 320 may receive packet data on physical links connected to a network (e.g., network 100). Each physical link could be one of many types of transport media, such as an optical fiber or an Ethernet cable.

I/O units 320 may process incoming packet data prior to transmitting the data to another I/O unit 320 or the network. I/O units 320 may perform route lookups for the data using the forwarding table from control unit 310 to determine destination information. If the destination indicates that the data should be sent out on a physical link, connected to I/O unit 320, then I/O unit 320 may prepare the data for transmission by, for example, adding any necessary headers and/or modifying existing headers, and/or transmitting the data from the port associated with the physical link. If the destination indicates that the data should be sent to another I/O unit 320 via switching unit 330, then I/O unit 320 may, if necessary, prepare the data for transmission to the other I/O unit 320 and/or may send the data to the other I/O unit 320 via switching unit 330.

Switching unit 330 may include one or multiple switching planes to facilitate communication among I/O units 320 and/or control unit 310. In one implementation, each of the switching planes may include a single-stage switch or a multi-stage switch of crossbar elements. Switching unit 330 may also, or alternatively, include processors, memories, and/or paths that permit communication among I/O units 320 and/or control unit 310.

As described herein, device 300 may perform certain operations. Device 300 may perform these operations in response to control unit 310 and/or one or more I/O units 320 executing software instructions contained in a computer-readable medium, such as a memory associated with control unit 310 and/or the one or more I/O units 320, respectively. The software instructions may be read into the memory from another computer-readable medium or from another device. The software instructions contained in the memory may cause control unit 310 and/or the one or more I/O units 320 to perform processes described herein. Alternatively, hardwired circuitry may be used in place of or in combination with software instructions to implement processes described herein. Thus, implementations described herein are not limited to any specific combination of hardware circuitry and software.

FIG. 4 is a diagram of an example QoS data structure 400 according to an implementation described herein. In one example implementation, QoS data structure 400 may be stored in a memory associated with PCRF server 155. In another implementation, QoS data structure 400 may be stored in a memory, associated with another device or a group of devices, separate from or in combination with the memory associated with PCRF server 155.

QoS data structure 400 may include a collection of fields, such as a QoS classification identifier (QCI) value field 410, a traffic type field 420, and forwarding classification field 430. Although FIG. 4 shows example fields 410-430, in other implementations, data structure 400 may include fewer fields, different fields, additional fields, or differently arranged fields than depicted in FIG. 4. Additionally, or alternatively, one or more fields of data structure 400 may include information described as being included in one or more other fields of data structure 400.

QCI value field 410 may store a particular QCI value (e.g., 1, 2, 3, etc.) that corresponds to a particular type of traffic. Traffic type field 420 may store information associated with a type of traffic that corresponds to the particular QCI value identified in QCI value field 410. The information, associated with the type of traffic, may include, for example, streaming audio (e.g., such as voice over IP (VoIP) traffic), streaming video, progressive video (e.g., via a progressive download protocol, an adaptive bit rate streaming protocol, etc.), network control signaling (e.g., IMS signaling), messaging (e.g., file transfer protocol (FTP), instant messaging protocol, email protocol, etc.), and/or another type of traffic. Forwarding classification field 430 may store information associated with a forwarding priority (e.g., expedited forwarding, assured forwarding, best efforts, strict priority queuing, delayed queuing, etc.), a bandwidth and/or a data rate (e.g., a guaranteed bit rate, a non-guaranteed bit rate, etc.), a probability of packet loss (e.g., when environment 100 becomes congested, etc.), etc. that corresponds to the particular type of traffic, identified in traffic type field 420, and/or the particular QCI value identified in QCI value field 410.

For example, PCRF server 155 may store a QCI value (e.g., QCI 1) that corresponds to a type of traffic (e.g., TYPE 1) and which corresponds to a forwarding classification (e.g., FC 1) (e.g., as shown by ellipse 432). In another example, PCRF server 155 may store another QCI value (e.g., QCI 2) that corresponds to a type of traffic (e.g., TYPE 2) and which corresponds to a forwarding classification (e.g., FC 2) (e.g., as shown by ellipse 434). PCRF server 155 may store other QCI values (e.g., QCI 3, . . . , QCI N, where N≥1) that correspond to other types of traffic (e.g., TYPE 3, . . . , TYPE N) and which correspond to other forwarding classifications (e.g., FC 3, . . . , FC N) (e.g., as shown by ellipses 436 and 438).

Generally, a QCI value may decrease as the priority, associated with the type of traffic increases. For example, a low QCI value (e.g., 1, 2, 3, etc.) may correspond to high priority traffic, such as VoIP traffic, live streaming video, etc. The high-priority traffic may be assigned, by PCRF server 155, a forwarding classification that causes signal bearers (e.g., eNB 120, SGW 130, PGW 170, etc.), associated with environment 100, to process the type of traffic based on a forwarding priority associated with expedited forwarding (EF). The EF forwarding priority may be associated with queuing delays that are less than a threshold, packet loss probabilities that are less than another threshold, and/or a bandwidth and/or data rate that is greater than a further threshold.

In another example, a medium QCI value (e.g., 4, 5, 6, etc.), that is greater than the low QCI value, may correspond to another type of traffic that is to be processed at a lower level of priority than the high-priority traffic. The other type of traffic (sometimes referred to as "mid-priority traffic") may include progressive streaming video, control signaling, etc. The mid-priority traffic may be assigned a forwarding classification that causes the signal bearers to process the mid-priority traffic based on a forwarding priority associated with assured forwarding (AF). The AF forwarding priority may be associated with queuing delays that are not less than the threshold, packet loss probabilities that are not less than the other threshold, and/or a bandwidth and/or data rate that is not greater than the further threshold.

In yet another example, a high QCI value (e.g., 7, 8, 9, etc.) that is greater than the medium QCI value may correspond to a further type of traffic that is to be processed at a lower level of priority than the mid-priority traffic. The further type of traffic (sometimes referred to as "low-priority traffic") may include message traffic (e.g., traffic based on an email protocol, a file transfer protocol, an instant messaging protocol, etc.), Internet browsing, data traffic, etc. The low-priority traffic may be assigned a forwarding classification that causes the signal bearers to process the low-priority traffic based on a forwarding priority associated with best efforts (BE) forwarding. The BE forwarding priority may be associated with queuing delays that are greater than a threshold associated with AF, packet loss probabilities that are greater than another threshold associated with AF, and/or a bandwidth and/or data rate that is less than a further threshold associated with AF.

FIG. 5 is a diagram of an example interoperable QoS policy data structure 500 (hereinafter referred to as "data structure 500") according to an implementation described herein. In one example implementation, data structure 500 may be stored in a memory associated with negotiation server 175. In another implementation, data structure 500 may be stored in a memory, associated with another device or a group of devices, separate from or in combination with the memory associated with negotiation server 175.

Data structure 500 may include a collection of fields, such as a group of network information fields 505-1, . . . , 505-P (where P≥1) (hereinafter referred to collectively as "network fields 505" and individually as "network field 505"), a traffic type field 510, and a group of QoS classification identifier (QCI) fields 515-1, . . . , 515-P. Although FIG. 5 shows example fields of data structure 500, in other implementations, data structure 500 may include fewer fields, different fields, additional fields, or differently arranged fields than depicted in FIG. 5. Additionally, or alternatively, one or more fields of data structure 500 may include information described as being included in one or more other fields of data structure 500.

Network field 505 may store information associated with a network. The information associated with the network may include, for example, an identifier associated with the network (e.g., a network name, a network identifier, etc.), information associated with a network domain that corresponds to the network, information associated with a gateway server that corresponds to the network (e.g., an identifier, an address, etc. associated with PGW server 170), etc. In another example, network field 505 may store information associated with HSS 150 that corresponds to the network (e.g., a device identifier, a network address, etc.). Traffic type field 510 may store information associated with a particular type of traffic that could be transported by one or more networks identified in network fields 505. QCI value field 515 may store a QCI value, associated with a network identified in network field 505, which corresponds to the particular type of traffic identified in traffic type field 510.

For example, negotiation server 175 may store information, associated with a particular type of traffic (e.g., TYPE 1, as shown by ellipse 520), that could be processed by one or more networks identified in network fields 505-1-505-P. Negotiation server 175 may store one or more QCI values (e.g., QCI 1, QCI 1, . . . , QCI 2), that correspond to the particular type of traffic (e.g., as shown by ellipse 520). Each of the one or more QCI values may be used by respective different network, of the networks identified in network fields 505-1-505-P, to process the particular type of traffic. In another example, negotiation server 175 may store information associated with another type of traffic (e.g., TYPE 2) (e.g., as shown by ellipse 522). Negotiation server 175 may store another one or more QCI values (e.g., QCI 2, QCI 3, . . . , QCI 1) that may be used by the respective different networks to process the other type of traffic (e.g., as shown by ellipse 522). Negotiation server 175 may store information associated with a further type of traffic (e.g., TYPE 3 and/or TYPE 4, as shown by ellipses 524 and 526, respectively). Negotiation server 175 may store, in a similar manner, a further one or more QCI values (e.g., QCI 3, QCI 2, . . . , QCI 3; and QCI 4, QCI 4, . . . , QCI 5) that may be used by the respective different networks to process the further type of traffic (e.g., as shown by ellipses 524 and 526, respectively).

Figure 6:
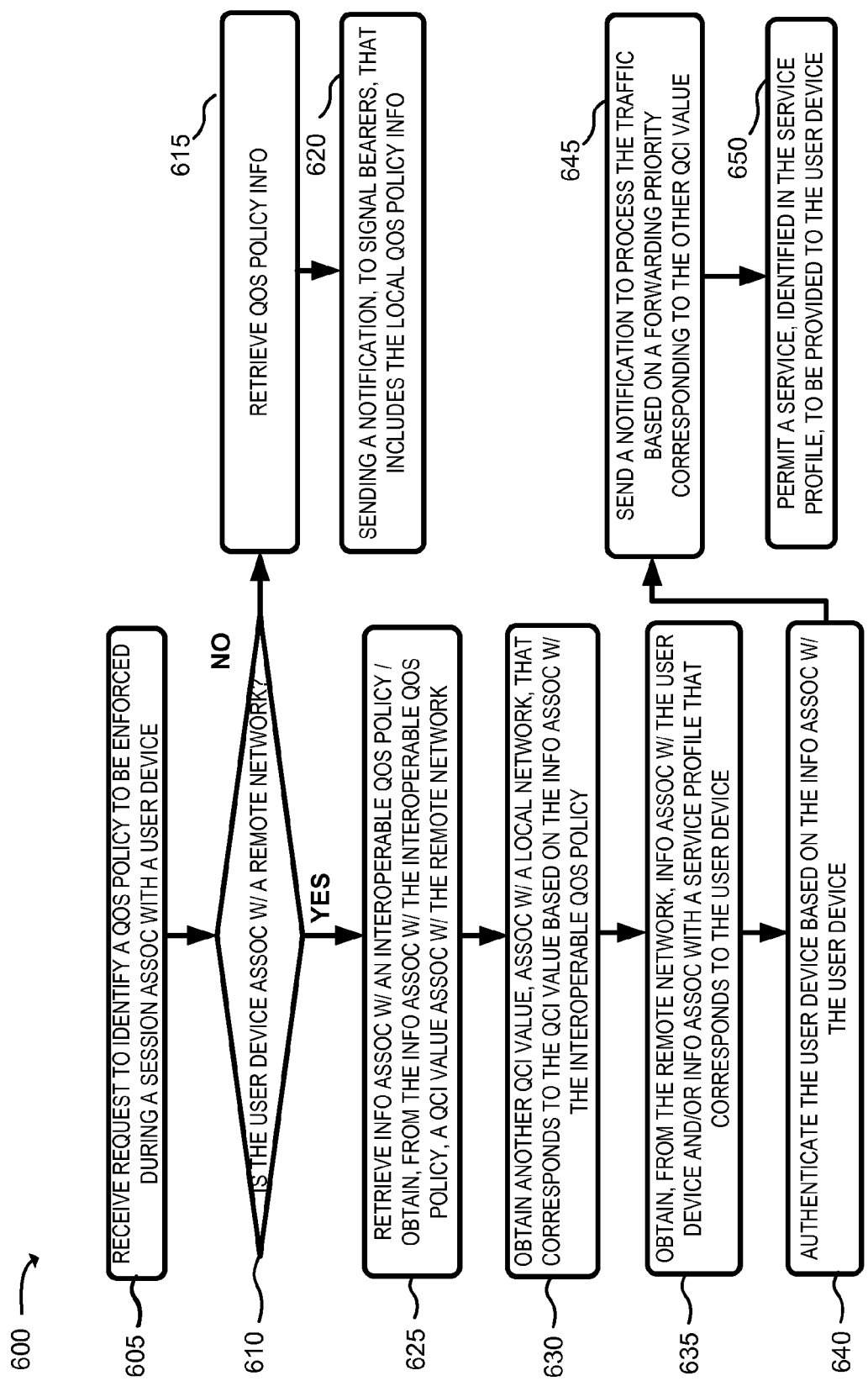
FIG. 6 is a flow chart of an example process for negotiating a QoS policy for processing traffic, associated with a user device that subscribes to a remote network, according to an implementation described herein.

FIG. 6 is a flow chart of an example process 600 for negotiating a QoS policy for processing traffic, associated with a user device 110 that subscribes to a remote network, according to an implementation described herein. In one example implementation, process 600 may be performed by PCRF server 155. In another example implementation, some or all of process 600 may be performed by a device or collection of devices separate from, or in combination with PCRF server 155.

As shown in FIG. 6, process 600 may include receiving a request to identify a QoS policy for enforcement during a session associated with a user device (block 605). For example, user device 110 may send traffic (e.g., a SIP request) requesting CSCF server 160 to initiate a communication and/or call session with environment 100. CSCF server 160 may receive the traffic and may determine whether user device 110 is registered with environment 100 based on information associated with the traffic. The information associated with the traffic may include information associated with user device 110, such as, for example, a device identifier (e.g., an MDN, SIP uniform resource identifier (URI), etc.), a network address (e.g., a source IP address, a MAC address, etc.), information associated with a home network and/or domain with which user device 110 is associated, etc. The information associated with the traffic may also include a destination address, information associated with a type of traffic.

CSCF server 160 may compare the received information associated with user device 110 with information associated with user device 110 stored in a memory associated with CSCF server 160 to determine whether the received information, associated with user device 110, matches information associated with user device 110 stored in the memory. In one example, CSCF server 160 may determine that user device 110 is associated with environment 100 when the received information, associated with user device 110, matches the stored information associated with user device 110. Based on the determination that user device 110 is associated with environment 100, CSCF server 160 may send, to PCRF server 155, a request to establish a local QoS policy to be used for a communication and/or call session associated with user device 110.

In another example, CSCF server 160 may determine that user device 110 is not associated with environment 100 when the received information, associated with user device 110, does not match the stored information associated with user device 110. CSCF server 160 may identify another network (e.g., a remote network associated with network 180 and/or another network) with which user device 110 is associated. Based on the determination that user device 110 is associated with a remote network, CSCF server 160 may send, to PCRF server 155, a request to establish a local QoS policy that conforms to a remote QoS policy associated with the remote network. PCRF server 155 may receive the request to establish the local QoS policy. The request may include an indication whether user device 110 is associated with environment 100 or the remote network, and/or information associated with the traffic.

As also shown in FIG. 6, if the user device is not associated with the remote network (block 610—NO), then process 600 may include retrieving local QoS policy information (block 615) and sending a notification to signal bearers that includes the local policy information (block 620). For example, PCRF server 155 may determine that the request includes an indication that user device 110 is associated with environment 100. Based on the determination that user device 110 is associated with environment 100, PCRF server 155 may retrieve, from a memory associated with PCRF server 155, information associated with a local QoS policy. The information associated with the local QoS policy may, in manner similar to that described above in FIG. 4, include one or more QCI values that corresponds to one or more types of traffic and/or one or more forwarding classifications.

PCRF server 155 may obtain, from the information associated with the local QoS policy, a QCI value and/or information associated with a forwarding priority (e.g., expedited forwarding, assured forwarding, best efforts, a probability of packet loss, etc.) that corresponds to a type of traffic as identified in the request received from CSCF server 160. PCRF server 155 may send a notification to signal bearers (e.g., eNB 120, SGW 130, PGW 170, etc.), associated with environment 100, that includes the information associated with the local QoS policy. Sending the notification to the signal bearers enables traffic, associated with communication and/or call session, to be processed based on a forwarding priority, bandwidth, data rate, probability of packet loss, etc. that conforms to the local QoS policy.

As also shown in FIG. 6, if the user device is associated with the remote network (block 610—YES), then process 600 may include retrieving information associated with an interoperable QoS policy and obtaining, from the information associated with the interoperable QoS policy, a QCI value associated with the remote network (block 625). For example, PCRF server 155 may determine that the request, received from CSCF server 160, includes an indication that user device 110 is associated with a remote network. Based on the determination that user device 110 is associated with the remote network, PCRF server 155 may communicate with negotiation server 175 to retrieve information associated with an interoperable QoS policy. Negotiation server 175 may, in response to the request, retrieve the information associated with the interoperable QoS policy from a memory associated with negotiation server 175. The information associated with the interoperable QoS policy may, in manner similar to that described above in FIG. 5, include one or more QCI values, associated with the remote network, that correspond to one or more different types of traffic. The information associated with the interoperable QoS policy may also include another one or more QCI values, associated with environment 100, that correspond to the one or more types of traffic.

PCRF server 155 may obtain, from the information associated with the interoperable QoS policy, a QCI value, associated with the remote network, which corresponds to the type of traffic identified in the request received from CSCF server 160. In another example implementation, PCRF server 155 may communicate with a device (e.g., another PCRF server 155), associated with the remote network, to obtain the QCI value that corresponds to the type of traffic.

As further described in FIG. 6, process 600 may include obtaining another QCI value, associated with a local network, that corresponds to the QCI value based on the information associated with the interoperable QoS policy (block 630). For example, PCRF server 155 may obtain, from the information associated with the interoperable QoS policy, another QCI value, associated with a local network (e.g., environment 100), that corresponds to the type of traffic identified in the request received from CSCF server 160. The other QCI value may also correspond to the QCI value, associated with the remote network, which may enable environment 100 to process the traffic, associated with user device 110, in a manner by which the remote network would process the traffic.

PCRF server 155 may retrieve, from a memory associated with PCRF server 155, information associated with a local QoS policy that corresponds to environment 100. PCRF server 155 may obtain, from the information associated with the QoS policy, information associated with a forwarding classification (e.g., a forwarding priority, bandwidth, a bit rate, probability of packet loss, etc.) that corresponds to the other QCI value.

As yet further described in FIG. 6, process 600 may include obtaining, from the remote network, information associated with the user device and/or information associated with a service profile that corresponds to the user device (block 635). For example, PCRF server 155 may obtain, from the information associated with the interoperable QoS policy, information pertaining to a device (e.g., HSS 150) associated with the remote network. The information, associated with the device may include a network address (e.g., an IP address, a MAC address, a URL, etc.) that allows PCRF server 155 to communicate with the device. PCRF server 155 may communicate with HSS 150, associated with the remote network, to obtain information associated with user device 110 and/or information associated with a service profile that corresponds to user device 110. The information associated with the service profile may identify a service and/or application to which user device 110 has subscribed (e.g., call forwarding, call waiting, etc.), APNs that are permitted for and/or accessible by user device 110, etc. PCRF server 155 may send the information, associated with the user device 110 and/or the service profile, to another HSS 150 associated with environment 100.

In another example implementation, PCRF server 155 may send the information, associated with the device, to the other HSS 150 associated with environment 100. Sending the information, associated with the device (e.g., HSS 150 associated with the remote network), to the other HSS 150 may allow the other HSS 150 to communicate with the device to obtain the information associated with user device 110 and/or the information associated with the service profile. In yet another example implementation, the other HSS 150 may communicate, with negotiation server 175, to obtain the information associated with the device. The other HSS 150 may use the information, associated with the device, to communicate with the device to obtain the information associated with user device 110 and/or the service profile.

As still further shown in FIG. 6, process 600 may include authenticating the user device based on the information associated with the user device (block 640). For example, the other HSS 150 may compare the information, associated with user device 110 that was obtained from the remote network, with information associated with user device 110 that was received from CSCF server 160. The other HSS 150 may authenticate user device 110 based on a determination that the information associated with user device 110, obtained from the remote network, matches the information, associated with user device 110, received from CSCF 160. The other HSS 150 may send a notification, to CSCF server 160 and/or PCRF server 155, indicating that user device 110 has been authenticated. If, however, the other HSS 150 determines that the information, associated with user device 110 that obtained from the remote network, does not match the information associated with user device 110, received from CSCF server 160, the other HSS 150 may not authenticate user device 110. Based on the determination that user device 110 cannot be authenticated, the other HSS 150 may send a notification that indicates that user device 110 is not permitted to access environment 100.

As also shown in FIG. 6, process 600 may include sending a notification to process the traffic based on a forwarding priority that corresponds to the other QCI value (block 645). For example, PCRF server 155 may, in response to the notification that user device 110 has been authenticated, send the information, associated with the forwarding classification (e.g., eNB 120, SGW 130, PGW 170, etc.) that corresponds to the other QCI value, to signal bearers associated with environment 100 (e.g., eNB 120, SGW 130, PGW 170, etc.). Sending the information, that corresponds to the forwarding classification, to the signal bearers may enable the signal bearers to process the traffic based on a forwarding priority, a bandwidth, a bit rate, a probability of packet loss, etc. that conforms to a remote QoS policy associated with the remote network.

As further described in FIG. 6, process 600 may include permitting a service, identified by the service profile, to be provided to the user device (block 650). For example, PCRF server 155 may, in response to the notification that user device 110 has been authenticated, identify one or more services, applications, APNs, etc. that are permitted to be used and/or accessed by user device 110, based on the information associated with the service profile. PCRF server 155 may send a notification to CSCF server 160 and/or the signal bearers (e.g., eNB 120, SGW 130, PGW 170, etc.) that indicates that the traffic, associated with user device 110, is to be processed in a manner that allows user device 110 to access and/or use the identified services, applications, APNs, etc.

Systems and/or methods, described herein, may enable a network to process traffic, received from a user device associated with a remote network, in a manner that conforms to a remote QoS policy associated with the remote network. The systems and/or methods may enable a PRCF server, associated with the network, to obtain information associated with an interoperable QoS policy that includes information associated with one or more QoS policies that are used by the network, the remote network, and/or another network.

The systems and/or methods may enable the PRCF server to use the interoperable QoS policy to obtain a QCI value, associated with the remote network, that corresponds to a type of the traffic being received from the user device. The QCI value may correspond to the remote QoS policy that identifies a forwarding priority, a bandwidth, a data rate, a probability of packet loss, etc. by which the remote network would process the type of traffic.

The systems and/or methods may enable the PRCF server to obtain, from the interoperable QoS policy, another QCI value that corresponds to a QoS policy associated with the network. The PRCF server may use the other QCI value to obtain, from the QoS policy, another forwarding priority, bandwidth, data rate, probability of packet loss, etc. that conforms to the remote QoS policy.

The systems and/or methods may enable the network to process the traffic, based on the other forwarding priority, bandwidth, data rate, probability of packet loss, etc., in a manner that conforms to the remote QoS policy. Processing the traffic, in the manner that conforms to the remote QoS policy, may enable the traffic and/or the services (e.g., that would have been proved by the remote network) to be provided to the user device without degrading performance and/or a user experience for the user of the user device.

The foregoing description provides illustration and description, but is not intended to be exhaustive or to limit the implementations to the precise form disclosed. Modifications and variations are possible in light of the above disclosure or may be acquired from practice of the embodiments.

While a series of blocks has been described with regard to FIG. 6, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

The term "packet" as used herein, may refer to a datagram, a data item, or a cell; a fragment of a packet, a fragment of a datagram, a fragment of a data item, a fragment of a cell; or another type, arrangement, or packaging of data.

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
receiving, by a first device associated with a network, a request to identify a quality of service (QoS) policy to be used to process traffic received from a user device associated with another network;
obtaining, by the first device, information associated with an interoperable QoS policy,
the information, associated with the interoperable QoS policy, identifying a first QoS level, associated with the other network, that corresponds to a type of traffic received from the user device;
obtaining, by the first device and from the information associated with the interoperable QoS policy, a second QoS level, associated with the network, that corresponds to the first QoS level;
sending, by the first device and to a second device associated with the network, an instruction to process the traffic based on the second QoS level;
obtaining, by the first device and based on the information associated with the interoperable QoS policy, information associated with a server device associated with the other network;
obtaining, by the first device and based on the information associated with the server device, service profile information, associated with the user device, from the server device,
the service profile information identifying at least one of:
a service associated with the user device,
an application associated with the user device,
or an access point name (APN) that the user device is permitted to access; and
providing the service profile information to a third device associated with the network,
the service profile information enabling at least one of a communication session or a call session to be established between the third device and the user device,
the at least one of the communication session or the call session enabling at least one of:
the service to be provided to the user device,
the application to be utilized by the user device, or
the APN to be accessed by the user device.

2. The method of claim 1, where the network is based on a third generation partnership project (3GPP) architecture,
where the first device is a policy and charging resource function (PCRF) server, and
where the second device is a signal bearer, associated with the network, that processes the traffic based on the second QoS level.

3. The method of claim 1, further comprising:
retrieving, from a memory associated with the first device, information associated with the QoS policy; and
obtaining, from the information associated with the QoS policy, a forwarding classification that corresponds to the second QoS level,
where the forwarding classification identifies at least one of:
a bandwidth associated with the traffic,
a data rate associated with the traffic,
a forwarding priority associated with the traffic, or
a probability of packet loss associated with the traffic.

4. The method of claim 1, where the server device comprises a first server device, and where the obtaining the information, associated with the interoperable QoS policy, further includes:
sending, to a second server device, another request for the information associated with interoperable QoS policy; and
receiving, from the second server device, the information associated with the interoperable QoS policy.

5. The method of claim 1, where the interoperable QoS policy includes one or more of:
information associated with one or more types of traffic,
information identifying one or more QoS levels, associated with the other network, that correspond to the one or more types of traffic,
where each of the one or more QoS levels correspond to a respective type of traffic of the one or more types of traffic, or
information identifying one or more other QoS levels, associated with the network, that correspond to the one or more types of traffic,
where each of the one or more other QoS levels correspond to another respective type of traffic of the one or more types of traffic.

6. The method of claim 1, further comprising:
receiving, by the first device, another request to identify another QoS policy to process a different type of traffic received from the user device;
identifying a third QoS level, associated with the other network, that corresponds to the different type of traffic based on the information associated with the interoperable QoS policy; and
sending, by the first device and to the second device, another instruction to process the different type of traffic based on a fourth QoS level obtained from the information associated with the interoperable QoS policy,
where the fourth QoS level corresponds to the third QoS level.

7. The method of claim 1, further comprising:
communicating, with the server device, to obtain information associated with the user device based on the information associated with the server device; and
sending the information, associated with the user device, to a further device,
where the further device is associated with the network, and
where the information, associated with the user device, enables an authentication of the user device based on:
the information associated with the user device, and
other information associated with the user device,
where the other information associated with the user device is obtained from the traffic.

8. A system, within a network, the system comprising:
a storage device to store quality of service classification identifier (QCI) values that correspond to the one or more types of traffic or to one or more forwarding priorities; and
one or more devices to:
receive traffic from a user device associated with another network,
obtain, based on receiving the traffic, an interoperable quality of service (QoS) policy,
The interoperable QoS policy including at least one of:
one or more QCI values, associated with the network, that correspond to the one or more types of traffic, or
another one or more QCI values, associated with the other network, that correspond to the one or more types of traffic, obtain, from the interoperable QoS policy, a first QCI value, of the other one or more QCI values, that corresponds to a type of traffic, of the one or more types of traffic, received from the user device, obtain, from the interoperable QoS policy, a second QCI value, of the one or more QCI values, that corresponds to the first QCI value, and process the traffic based on a forwarding priority, of the one or more forwarding priorities, that corresponds to the second QCI value.

9. The system of claim 8, where the one or more devices are further to:

receive other traffic from another user device, determine that the user device is associated with the network based on information associated with the other traffic, process the other traffic based on a second forwarding priority, of the one or more forwarding priorities, based on the user device being associated with the network, where the second forwarding priority corresponds to another type of traffic, of the one or more types of traffic, received from the user device.

10. The system of claim 8, where the one or more devices are further to:

determine whether another user device is associated with the network or the other network based on information associated with traffic received from the other user device, process the traffic using a QoS policy associated with the network when the other user device is associated with the network, and process the traffic using the interoperable QoS policy when the other user device is associated with the other network.

11. The system of claim 8, where the one or more devices are further to:

obtain, from the interoperable QoS policy, a network address for a server device associated with the other network, communicate, with the server device and using the network address, to obtain information associated with the user device, and authenticate the user device based on the information associated with the user device, obtained from the server device, and other information associated with the user device, where the other information associated with the user device is obtained from information associated with the traffic.

12. The system of claim 8, where, when obtaining the interoperable QoS policy, the one or more devices are further to:

communicate with a server device, associated with the other network, to obtain the other one or more QCI values, store the other one or more QCI values in the interoperable QoS policy in a manner that corresponds to the one or more types of traffic, and store the one or more QCI values in the interoperable QoS policy in the manner that corresponds to the one or more types of traffic.

13. The system of claim 8, where, when obtaining the interoperable QoS policy, the one or more devices are further to:

send a request, to a server device, for the interoperable QoS policy, and receive, from the server device, the interoperable QoS policy.

14. A device associated with a network, the device comprising:

a memory to store a quality of service (QoS) policy, the QoS policy including one or more forwarding classifications that correspond to one or more types of traffic; and one or more processors to:

receive, from a user device associated with another network, a request to establish a communication session;

obtain, by the device and based on receiving the request, an interoperable QoS policy, the interoperable QoS policy, including:

a plurality of QoS classification identifier (QCI) values, associated with the other network, that correspond to the one or more types of traffic, and a plurality of other QCI values, associated with the Internet protocol multimedia subsystem (IMS) core, that correspond to the one or more types of traffic, identify a first QCI value, of the plurality of QCI values, that corresponds to a type of traffic, of the plurality of types of traffic, identified by the request;

identify a second QCI value, of the plurality of other QCI values, that corresponds to the first QCI value;

obtain, from the memory, a forwarding classification, of the one or more forwarding classifications, that corresponds to the second QCI value, and establish the communication session in a manner that enables the traffic to be processed based on the forwarding classification.

15. The device of claim 14, where the forwarding classification corresponds to at least one of:

a minimum bandwidth associated with the traffic, a minimum data rate associated with the traffic, or a forwarding priority, associated with the traffic, that corresponds to:

a quantity of queuing delay that is less than a threshold quantity of queuing delay, or a probability of packet loss that is less than a threshold probability of packet loss.

16. The device of claim 14, where, when obtaining the interoperable QoS policy, the one or more processors are further to:

transmit, to a server device, another request for the information associated with interoperable QoS policy; and receive, from the server device, the information associated with the interoperable QoS policy.

17. The device of claim 16, where the server device is associated with at least one of:

the IMS core, the other network, or a further network that is different than the IMS core or the other network.

18. The device of claim 14, where the one or more processors are further to:

obtain, from the QoS policy, the plurality of other QCI values, associated with the IMS core, that correspond to the one or more types of traffic, and transmit the plurality of other QCI values to a server device, where the plurality of other QCI values enable the server device to store the plurality of other QCI values in the interoperable QoS policy in a manner that corresponds to the one or more types of traffic.

19. The device of claim 14, where the one or more processors are further to:
- obtain, from the interoperable QoS policy, a network address associated with a home subscriber server associated with the other network,
- communicate, with the home subscriber server and using the network address, to identify at least one of a service, an application, or an access point name (APN) that the user device is permitted to receive or to access, and
- process the traffic to permit the user device to receive or to access the at least one of the service, the application, or the APN.

20. The method of claim 3, further comprising:
- providing the information associated with the QoS policy to a negotiation server to cause the information associated with the interoperable QoS policy to be updated.

* * * * *